United States Patent Office 2,707,623
Patented May 3, 1955

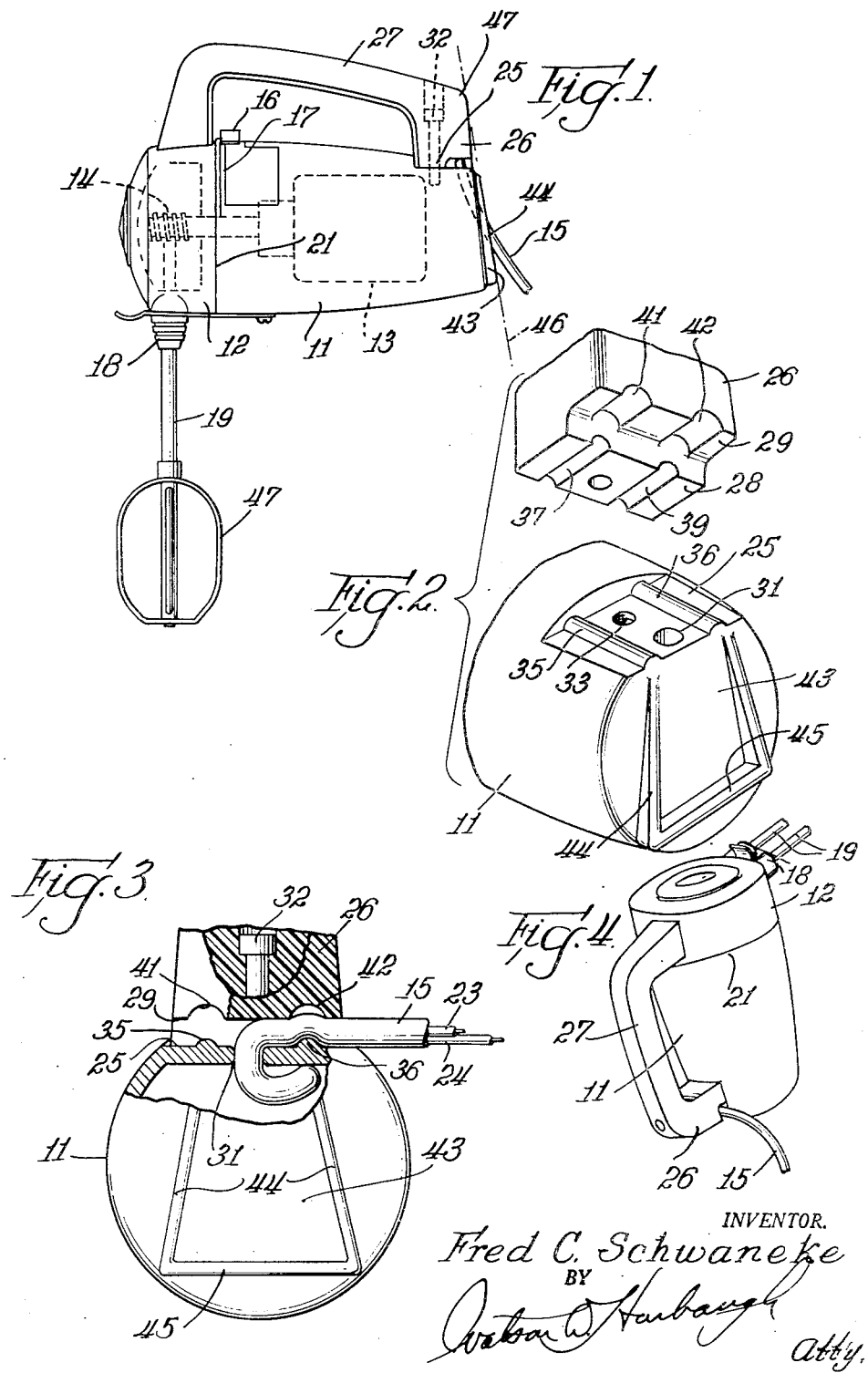

2,707,623

PORTABLE FOOD MIXER

Fred C. Schwaneke, Chicago, Ill., assignor to Dormeyer Corporation, Chicago, Ill., a corporation of Illinois Application November 12, 1952, Serial No. 319,828

6 Claims. (Cl. 259—135)

The present invention relates to portable food mixing apparatus and concerns itself more particularly with electric service cord terminal junction apparatus therefor.

Electrically driven food mixers customarily have a principal housing body which contains an electric driving motor and a gear train. At the forward end of the housing body there are usually provided one or more sockets in which there are removably secured rotatable spindle elements which carry at their remote ends beater paddles. Where multiple spindles are employed the sockets are driven as to effect an interdigitating rotation to the paddles. The spindles usually extend in a radial direction from the principal or longitudinal axis of the housing while on the opposite side of the housing there is usually provided a grip handle frequently of the closed loop type or with perpendicular end stud portions bolted or otherwise secured to the body.

In order to be able to place the appliance out of hand conveniently following its use, it is provided with support fixtures at its rear end, permitting it to be up-ended and thus balanced with its spindles poised in a lateral position. For this purpose a slight rearward cant of the appliance is desirable when it is disposed in the up-ended position in order to establish adequate center-of-gravity resolution to accommodate not only the mass distribution of the apparatus itself but in addition to allow for a variable quantity of batter which may adhere to the paddles.

Stability indicates that the unit have a squat low-level center of gravity during its up-ended condition. Yet egress accessibility to the service cord requires that this cord communicate with the electric driving motor contained inside the housing through an aperture located at the rear and preferably on the handle side of the housing. Otherwise the cord is likely to interfere with the manoeuverability of a portable type food mixer by ranging within the scope of its beater paddles or by interfering with the mixing bowls or other dishes which may be required for use during batter preparation.

Accordingly, a principal object of the present invention is to provide an electric service cord terminal junction apparatus of efficient design and economical construction which will assure safety and security to the electrical service cord by keeping it out of conflict with the up-ending support fixtures of the appliance for the purpose of promoting greater efficiency and freedom in the handling of such appliance both during its operating and rest conditions.

Another object of the present invention is to provide an electric service cord terminal junction apparatus having radial accessibility to a barrel-shaped appliance casing and deflectable tangentially near its point of entry into the casing and securely clamped thereto by a mutual impingement between a portion of the casing and an applied gripping handle attachment, whereby the service cord is strain relieved against movement in either direction and is safely held in a direction to avoid interference with support fixture appurtenances of both the casing and handle elements.

Yet another object of the present invention is to provide a casing element and a detachable manipulation grip or handle therefor in which predeterminedly spaced portions of each of said component elements possess opposed ridge and groove portions between which an emergent service cord cable may be effectively clamped to resist accidental dislodgment thereof without incurring any appreciable hazard to the insulation of its contained conductors.

Further and other objects of this invention are such as will manifest themselves during the course of the following detailed description and such as will be revealed in the annexed illustrations in both of which like reference numerals designate corresponding parts throughout, and in which:

Fig. 1 is a side elevational view of a portable food mixer apparatus having embodied therein certain features of the present invention, Fig. 2 is a fragmentary exploded perspective view of the handle and casing elements of a food mixer apparatus according to the features illustrated in Fig. 1, Fig. 3 is an end elevational view of the same construction with portions broken away and in section, while Fig. 4 is a perspective view on a reduced scale illustrating the food mixer apparatus in its up-ended position.

In the accompanying drawing the reference numerals 11 and 12 designate correspondingly the rear and forward casing components which together form an enclosure containing among other things an electric driving motor 13, Fig. 1, and a transmission system of speed reducing gears generally designated 14. Power for actuating the electric motor 13 is customarily obtainable from any suitable source through a flexible conductor cable 15 which usually carries on its remote end a dual prong type of attachment plug.

The speed of the motor 13 is regulated by an adjustable resistance in series with one of its windings operable through a finger control lever 16 movable in the slot or groove 17 over an indexed course of travel. The motor power is transmitted to one or more spindle receiving sockets 18, see also Fig. 4, imparting rotation to the beater spindles 19 in a well known manner.

In order to prevent infiltration into the housing 11—12 by flour, dust, or other harmful airborne substances such as are ever present in the environment in which these classes of apparatus are used, the casing elements are designed to be close-fitting and to have but minimum exposure apertures limited to fulfill the requirements of air cooling without subjecting the movable parts to the undesired exposure. In keeping with these objectives and at the same time fulfilling minimum strength and durability characteristics the casing components 11 and 12 are advantageously produced by die casting and through the use of one of the suitable or appropriate pressure moldable metals.

Accordingly the housing components require to be so designed that their formation under pressure-induced flow of these metals into male and female casting dies will be attended by practical and facile separation of the die elements following each pouring or casting operation.

When therefore a body housing is composed of several components as in this case, their line of mutual separation 21 requires to be at or near the largest girth dimension. Where the rearward attenuation slope differs from the forward one as in the case of the barrel shaped housing illustrated in Fig. 1, the rear component 11 will constitute the longer physical dimension and accordingly its molding core element will require more meticulous care in provision of a rake angle in order to facilitate the separation of the die members following each casting operation.

The operating motor 13 is customarily housed within the larger of the two component bodies particularly when they contrast in the manner of the illustration. This presents manufacturing assembly problems as regards facile introduction and subsequent securement of the service cable 15 which requires to be connected to the winding of the motor 13 as well as to the speed regulating device 16. These problems include facility in making the required solder connections between the cable conductors 23 and 24 and the terminal elements of the switch and motor as well as the seating or other placing of these electrical parts into the nested or caged position in which they are maintained during operation and assembly.

To be able to make these solder connections in an easily accessible manner and then to back the surplus cable 15 out as the motor and switch elements are placed into their permanent position are concerns of major labor-saving advantage and consequently reflect cost efficiency in the over-all manufacturing picture. These operations have been made extremely simple yet practical by reason of the features which will now be more particularly emphasized and more detailedly described.

At the rear of the casing element 11 and on the handle attachment side thereof an end segment is horizontally cut off to provide a flattened surface 25, Fig. 2. The inner shape of the casing cavity may be correspondingly conformed. To fit with this surface the stud portion 26 of the gripping handle 27 is designed to terminate with a cooperating flush surface 28 though of somewhat narrower extent in a longitudinal direction respecting the casing assembly. By the extent to which area 28 is short of being coextensive with the surface 25 handle stud 26 is provided with an offset planar surface 29 parallel to the surface area 28 and preferably of somewhat narrower dimension as illustrated in Fig. 2, with the two areas 28 and 29 preferably equal in expanse. The spacing or distance between offset surface 29 and casing surface 25 is preferably a predetermined fairly accurate dimension depending upon the diameter of the conductor carrying cable 15. Usually appliance cables employed for this purpose are sturdily constructed and encased in a solid rubber or other flexible jacketing. This permits the cable 15 to be firmly clamped between the aforedescribed surfaces after the manner illustrated in Fig. 3. This clamping action combined with the sharp angular construction of the cable as it emerges from the opening 31, constitutes an adequately secure holding of the cable element under sufficient confinement, when the handle 27 is drawn firmly against the casing element 11 by the action of one or more perpendicularly directed shoulder screws 32.

In the instant embodiment but one shoulder screw 32 is illustrated together with a single threaded aperture 33 in the casing element 11 for the reception of its threaded extremity. In addition to the already described clamping provision for the cable 15 a further and more positively acting securement is provided including two longitudinal ribs 35 and 36 of semi-circular cross section that rise above the surface 25 and are therefore compatible with free extraction from the die following casting.

In the handle element 27 the surface 28 is correspondingly grooved as at 37 and 39 to snugly receive the ridges 35 and 36 for affording rigid anchor to the assembly even when but one anchor screw 32 is used for drawing the parts together. In the spaced surface 29 a pair of corresponding recesses 41 and 42 is provided but in their case the radius of curvature is somewhat greater than in the case of recesses 37 and 39 so that the cable 15 in addition to being clamped between the surfaces 25 and 29 is also depressed into one or the other of the recesses 41 and 42 depending upon which direction is preferred for cable emergence.

For righthanded operation the cable 15 is advantageously directed after the manner illustrated in Fig. 4 so that when the appliance is up-ended disposing the beater spindles 19 in poised position, the cable 15 will not interfere with the inclined seating fixtures which will now be described. The rear surface 43 of casing element 11 is preferably an inclined plane from the axis normal as best indicated in Fig. 1. In addition there is embossed on this surface a triangular rib comprising the side elements 44 and the connecting rib section 45. A planar continuation of the ribs 44 and 45 indicated in Fig. 1 by the line 46 lies tangential to the extremity of handle 27 as at 47. Accordingly, when the appliance is disposed after the manner illustrated in Fig. 4, it will lean backward in the direction of handle 27 with a substantial cant establishing a sufficient resolution in the weight distribution so that even when the paddles 48 are laden with adhering batter material the appliance will maintain its up-ended position securely balanced and without interference on the part of the service cable 15.

In summarizing, it is called to attention that the foregoing described structural features involving the arrangement and disposition of ridges and recesses as well as the provision of the surfaces 25, 28 and 29 together with the embossed ribbing 44 and 45 provide an improved fixture stability and service cord clamping arrangement which facilitates rapid and economical assembly line practices as well as making available more economical and efficient die casting advantages in the production of the appliance casing elements.

While the present invention has been explained and described with reference to a specifically illustrated embodiment it will be understood nevertheless that numerous changes and modifications are susceptible of being incorporated without departing from the essential spirit or scope thereof. Accordingly, it is not intended for an understanding of inventive scope to be limited by the particular language chosen in the foregoing description nor by the illustrations of the accompanying drawing except as indicated in the hereunto appended claims.

What is claimed is:

1. In a portable food mixer, a principal barrel shaped enclosure member comprised of interfitting cup components, an electric motor and transmission gear train contained in said member, a beater spindle driven by the train extending radially from one side and at the forward end of the member, a grip handle including front and rear end post portions secured at the opposite side of the member, said rear end post portion of the handle terminating with relatively displaced flat surfaces and said member being provided thereat with a cooperating surface coextensive with both the handle surfaces, one of said handle surfaces being spaced from said surface on said member, said handle and housing surfaces including spaced longitudinal ridges in one and corresponding grooves in the other, and a flexible service cord emerging from the electric motor in the member clamped between the handle surface spaced from the member surface and the member surface and restrained between an adjacent surface ridge and groove thereat to direct its issue sidewardly of the handle end post.

2. The combination set forth in claim 1 in which the rear one of said member cup components has its closed end formed on an inclination to impart a rearward cant to the mixer when up-ended.

3. A portable food mixer or similar appliance comprising a barrel shaped housing, an electric driving motor and gear train contained in said housing, a beater spindle driven by the train extending radially from one side and at the forward end of the housing, a closed loop handle secured at the opposite side of the housing, said opposite side of the housing having ridges formed thereon, said handle terminating with a flat surface spaced from said housing and provided with clamping grooves which align with the ridges on said housing to clamp between them a service cord leading from the electric motor contained in the housing.

4. The combination set forth in claim 3 in which the rear of said housing is provided with a service cord access aperture in its surface beneath said handle surface spaced from said housing and located at one side of at least one of said clamping grooves and ridges so that the service cord is thereby given an angular distortion followed by a clamping confinement between the aligned groove and ridge.

5. A terminal junction apparatus for electrical appliance cords comprising in combination with a principal housing member containing an electrical operating device, a handle secured to the housing member in a longitudinal direction, a rear portion to said handle having an abutting surface for engagement with the housing member and adjacent thereto a surface spaced from said housing member, said housing member having in its surface beneath said spaced surface on the rear handle an aperture through which a service cord from the operating device emerges, and ridge elements formed in the housing surface seating in snugfitting grooves of said abutting surface on said rear portion and aligning with similar grooves in said spaced surface on said rear portion whereby the emerging service cord is first sidewardly directed then clampedly confined.

6. A terminal junction apparatus for electrical appliance cords comprising in combination with a principal housing member containing an electrical operating device, a handle member secured to the housing member in a longitudinal direction, one of said members having a mounting surface and the other member having an abutting surface for engagement with a mating portion of the mounting surface and a surface spaced from the other portion of said mounting surface, said abutting and mating surfaces including a recess in one and a corresponding offset on the other mating therewith, one of the surfaces of said abutting and said other surfaces having a groove and the other surface having a ridge opposite said groove, said housing member having in its surface at said spaced surface an aperture through which a service cord from the operating device emerges, and means for securing the handle member on said housing member, said ridge and groove being adapted to clamp and confine therebetween said emerging service cord when said handle member is secured in place on said housing member.

References Cited in the file of this patent

UNITED STATES PATENTS

| | | |
|---|---|---|
| 1,435,847 | Howard | Nov. 14, 1922 |
| 1,489,182 | Weinberg | Apr. 1, 1924 |
| 2,048,183 | Dormeyer | July 21, 1936 |
| 2,406,389 | Lee | Aug. 27, 1946 |
| 2,525,338 | Brown et al. | Oct. 10, 1950 |
| 2,615,942 | Edman | Oct. 28, 1952 |